(12) United States Patent
Kurumisawa et al.

(10) Patent No.: US 9,015,100 B2
(45) Date of Patent: Apr. 21, 2015

(54) PRECEDING-VEHICLE IDENTIFYING APPARATUS AND FOLLOWING-DISTANCE CONTROL APPARATUS

(71) Applicant: Denso Corporation, Kariya, Aichi-pref. (JP)

(72) Inventors: Jin Kurumisawa, Kariya (JP); Tatsuya Namikiri, Kariya (JP)

(73) Assignee: Denso Corporation, Kariya (JP)

( * ) Notice: Subject to any disclaimer, the term of this patent is extended or adjusted under 35 U.S.C. 154(b) by 190 days.

(21) Appl. No.: 13/676,402

(22) Filed: Nov. 14, 2012

(65) Prior Publication Data

US 2013/0179379 A1 Jul. 11, 2013

(30) Foreign Application Priority Data

Jan. 10, 2012 (JP) ................................. 2012-002344

(51) Int. Cl.
| | |
|---|---|
| G06F 17/00 | (2006.01) |
| G06N 5/02 | (2006.01) |
| G06N 7/00 | (2006.01) |
| G05D 1/02 | (2006.01) |

(52) U.S. Cl.
CPC .................. *G06N 5/02* (2013.01); *G06N 7/005* (2013.01); *G05D 1/0291* (2013.01)

(58) Field of Classification Search
None
See application file for complete search history.

(56) References Cited

U.S. PATENT DOCUMENTS

| | | | |
|---|---|---|---|
| 5,510,990 A * | 4/1996 | Hibino et al. .................... 701/96 |
| 5,529,139 A * | 6/1996 | Kurahashi et al. ............ 180/169 |
| 5,652,705 A * | 7/1997 | Spiess ........................... 701/117 |
| 6,662,108 B2 * | 12/2003 | Miller et al. ................... 701/301 |
| 6,662,642 B2 * | 12/2003 | Breed et al. ...................... 73/146 |
| 7,103,460 B1 * | 9/2006 | Breed ........................... 701/32.9 |
| 7,672,756 B2 * | 3/2010 | Breed ................................ 701/1 |
| 7,840,355 B2 * | 11/2010 | Breed et al. ................... 701/301 |
| 2001/0037165 A1 | 11/2001 | Shirai et al. |
| 2001/0053955 A1 | 12/2001 | Shirai et al. |

(Continued)

FOREIGN PATENT DOCUMENTS

| | | |
|---|---|---|
| JP | 11-045398 | 2/1999 |
| JP | 2001-283391 | 10/2001 |

(Continued)

OTHER PUBLICATIONS

Office action dated Mar. 11, 2014 in corresponding Japanese Application No. 2012-002344.

(Continued)

*Primary Examiner* — Kakali Chaki
*Assistant Examiner* — Luis Sitiriche
(74) *Attorney, Agent, or Firm* — Harness, Dickey & Pierce, PLC

(57) ABSTRACT

The preceding vehicle identifying apparatus calculates an integrated probability of existence of a curved road ahead of an own vehicle based on at least two of the curvature of the curved road, the track of a vehicle running ahead of the own vehicle and the own vehicle' having entered the curved road. The preceding vehicle identifying apparatus further calculates an own-vehicle lane probability which is a probability that the vehicle is running in the same lane as an own-vehicle lane in which the own vehicle is running based on the distance between a predicted running line of the own vehicle and the track of the vehicle running ahead of the own vehicle, and compensates the calculated own-vehicle lane probability based on the integrated probability.

17 Claims, 5 Drawing Sheets

(56) References Cited

U.S. PATENT DOCUMENTS

2004/0143416 A1    7/2004  Hattori et al.
2007/0010937 A1*   1/2007  Sakuma .................. 701/200
2010/0321174 A1*  12/2010  Chen et al. ............... 340/435

FOREIGN PATENT DOCUMENTS

| JP | 2001-319299 | 11/2001 |
| JP | 2001-328451 | 11/2001 |
| JP | 2004-217178 | 8/2004 |

OTHER PUBLICATIONS

Office action dated Nov. 19, 2013 in corresponding Japanese Application No. 2012-002344.

* cited by examiner

PRECEDING-VEHICLE IDENTIFYING APPARATUS AND FOLLOWING-DISTANCE CONTROL APPARATUS

This application claims priority to Japanese Patent Application No. 2012-2344 filed on Jan. 10, 2012, the entire contents of which are hereby incorporated by reference.

BACKGROUND OF THE INVENTION

1. Field of the Invention

The present invention relates to a preceding-vehicle identifying apparatus and a following-distance control apparatus.

2. Description of Related Art

It is known to mount an ACC system (Adaptive Cruise Control system) which uses a scanning sensor on a vehicle for easing a vehicle driver's burden. The ACC system automatically controls the vehicle speed of an own vehicle at a set speed, and automatically controls the following distance (the distance to a preceding vehicle) detected by the scanning sensor at a predetermined distance. That is, the ACC system operates to decrease the speed of the own vehicle when the speed of the preceding vehicle is smaller than the set speed by causing the brake to apply to keep the following distance the same, and increases the speed of the own vehicle up to the set speed after the preceding vehicle disappears.

There is known a method performed in such an ACC system for predicting the course of the own vehicle using a curve curvature calculated based on the yaw rate of the own vehicle, and identifying a vehicle present on the predicted course of the own vehicle as a preceding vehicle. For example, refer to Japanese Patent Application Laid-open No. H11-045398.

However, the method described in this patent document has a problem in that the identification of a preceding vehicle may not be performed correctly due to a difference between the predicted course of the own vehicle and the course of the preceding vehicle caused by a difference in running position between the own vehicle and the preceding vehicle. This problem becomes conspicuous when there is a curved road ahead of the own vehicle.

If it is erroneously determined that there is no preceding vehicle due to the above problem, it may occur that the speed of the own vehicle is unnecessarily increased causing the following distance to be decreased, and the behavior of the own vehicle feels unnatural to the vehicle driver. Further, if it is erroneously determined that there is an preceding vehicle due to the above problem, it may occur that the speed of the own vehicle is unnecessarily decreased, and the behavior of the own vehicle feels unnatural to the vehicle driver.

SUMMARY

An exemplary embodiment provides a preceding-vehicle identifying apparatus for identifying, as a preceding vehicle, a vehicle running ahead of an own vehicle based on an own-vehicle lane probability which is a probability that the vehicle is running in the same lane as an own-vehicle lane in which the own vehicle is running, including:

a detection signal acquiring section that receives at least two of a first detection signal indicative of a curvature of a curved road ahead of the own vehicle, a second detection signal indicative of a track of a vehicle running ahead of the own vehicle and a third detection signal indicative of the own vehicle' having entered the curved road, the first to third detection signals being outputted from first to third detecting sections, respectively, which are mounted on the own vehicle;

a first calculating section that calculates at least two of a first probability of existence of the curved road ahead of the own vehicle based on the first detection signal, a second probability of existence of the curved road ahead of the own vehicle based on the second detection signal and a third detection signal of existence of the curved road ahead of the own vehicle based on the third detection signal, and calculates an integrated probability of existence of the curved road ahead of the own vehicle based on integration of the at least two of the first to third probabilities; and a second calculating section that calculates the own-vehicle lane probability based on a distance between a predicted running line of the own vehicle along which the own vehicle is predicted to run and the track of the vehicle running ahead of the own vehicle, and performs an own-vehicle lane probability compensation process for compensating the calculated own-vehicle lane probability based on the integrated probability.

The exemplary embodiment further provides a following-distance control apparatus mounted on a vehicle for controlling a following distance between the own vehicle and a preceding vehicle running in the same lane as the own vehicle within a predetermined range when the own vehicle follows the preceding vehicle, comprising:

the above-recited preceding-vehicle identifying apparatus; and a controller for controlling a following distance between the own vehicle and a vehicle identified as the preceding vehicle by the preceding-vehicle identifying apparatus by controlling a running speed of the own vehicle in accordance with the following distance.

According to the exemplary embodiment, there are provided a preceding-vehicle identifying apparatus which is capable of identifying a preceding vehicle at an early timing, and a following-distance control apparatus which is capable of keeping the following distance within a predetermined range reliably and correctly.

Other advantages and features of the invention will become apparent from the following description including the drawings and claims.

PREFERRED EMBODIMENTS OF THE INVENTION

Figure 1:
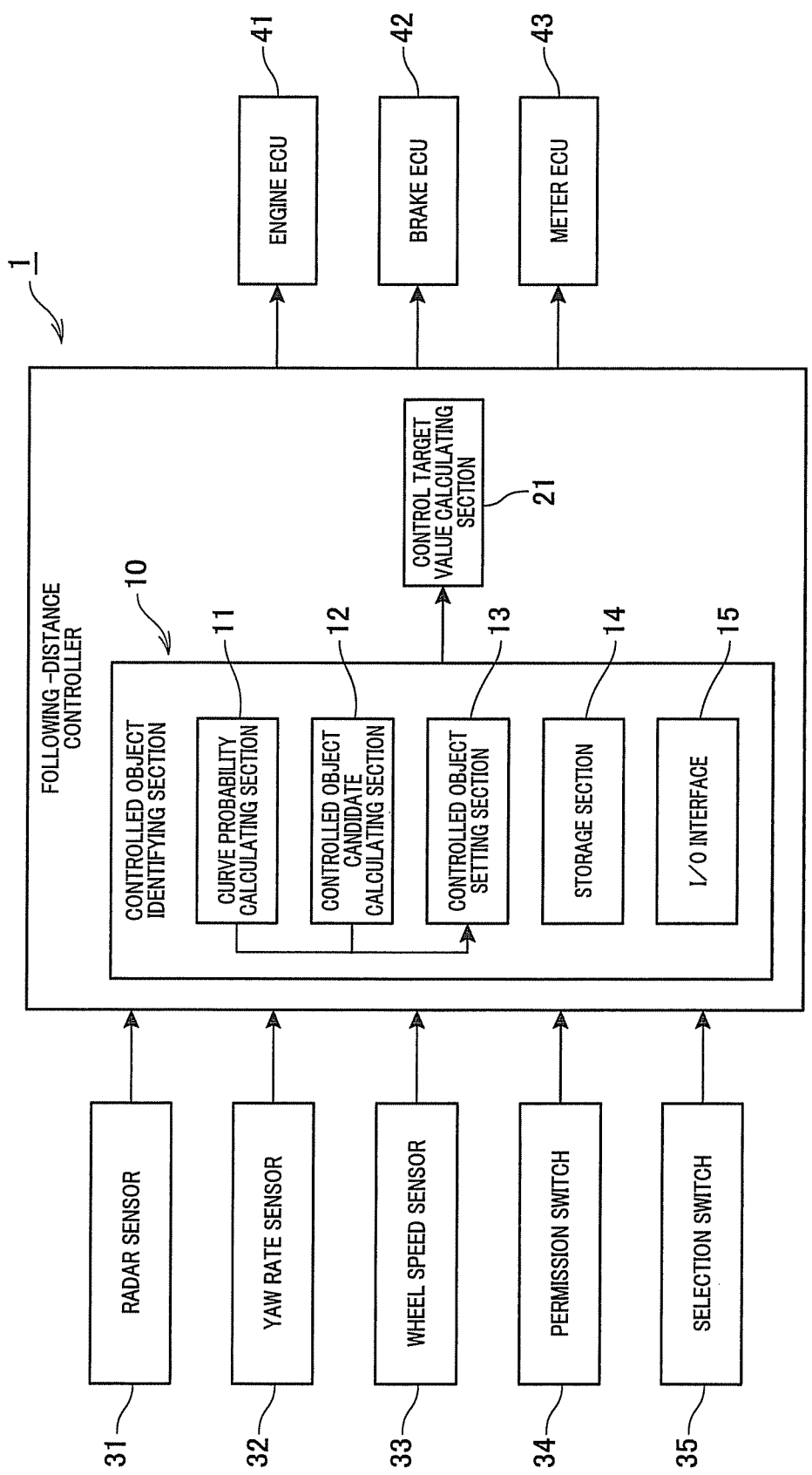
FIG. 1 is a schematic diagram showing the structure of a following-distance controller according to an embodiment of the invention.

FIG. 1 is a schematic diagram showing the structure of a following-distance controller 1 according to an embodiment of the invention.

The following-distance controller 1 is mounted on a vehicle equipped with an ACC system (the vehicle being referred to as the own vehicle hereinafter). The ACC system uses the following-distance controller 1 for controlling the following distance when the own vehicle runs following a preceding vehicle running in the same lane as the own vehicle (referred to as the "own vehicle lane" hereinafter).

As shown in FIG. 1, the following-distance controller 1 is constituted mainly of a controlled object identifying section (preceding-vehicle identifying apparatus) 10 and a control target value calculating section (control section) 21. The controlled object identifying section 10 determines whether or not the own vehicle is running following a preceding vehicle. The control target value calculating section 21 controls the following distance (the distance between the own vehicle and the preceding vehicle).

The controlled object identifying section 10 is constituted mainly of a curve probability calculating section (a first calculating section) 11, a controlled object candidate calculating section 12, a controlled object setting section (a second calculating section) 13, a storage section 14 and an I/O interface (an acquiring section) 15.

The curve probability calculating section 11 estimates the curvature of a curved road ahead of the own vehicle and the rate of change of the curvature, and calculates a probability of existence of a curved road ahead of the own vehicle. The controlled object candidate calculating section 12 identifies a preceding vehicle as a controlled object candidate from objects detected to be present ahead of the own vehicle by a radar sensor 31.

The controlled object setting section 13 identifies a preceding vehicle as a controlled object based on an own-vehicle lane probability which is a probability that a vehicle ahead of the own vehicle is running in the same lane as the own vehicle.

The curve probability calculating section 11, the controlled object candidate calculating section 12, the controlled object setting section 13 are explained in detail later.

In the following, the curve probability calculating section 11, the controlled object candidate calculating section 12 and the controlled object setting section 13 are described as independent components. However, their functions may be implemented by a single calculating section.

The storage section 14 is for storing various kinds of data including probability maps used in various calculating processes performed by the curve probability calculating section 11, the controlled object candidate calculating section 12 and the controlled object setting section 13, and for temporarily storing various kinds of calculated probabilities.

The I/O interface 15 receives various sensor signals. More specifically, the I/O interface 15 receives the signals outputted from the radar sensor 31 for detecting the position of a preceding vehicle or the like running ahead of the own vehicle, a yaw rate sensor 32 for detecting a yaw rate of the own vehicle, a wheel speed sensor 33 for detecting the running speed of the own vehicle based on the rotating speed of the wheel of the own vehicle, a permission switch 34 receiving a signal indicative of permission or inhibition of control by the following distance controller 1 and a selection switch 35 for selection of control mode of the following-distance controller 1.

In this embodiment, the radar sensor 31 is the one that uses a radio wave of a millimeter-wave band. However, the radar sensor 31 is not limited thereto. For example, a scanning laser radar which uses a laser light, such as a LIDAR (laser infrared radar) may be used as the radar sensor 31. Likewise, any appropriate sensor may be used as the yaw rate sensor 32 or the wheel speed sensor 33.

The control target value calculating section 21 is for keeping the following distance between the own vehicle and a preceding vehicle identified by the controlled object identifying section 10 within a predetermined range by controlling the running speed of the own vehicle. More specifically, the control target value calculating section 21 is for calculating a control target value of output power of an engine ECU 41 and a control target value of braking operation of a brake ECU, and generating control signals to be outputted to the engine ECU 41 and the brake ECU 42.

Next, the process for controlling the following distance to a preceding vehicle, and the process for identifying a preceding vehicle and compensating the calculated own-vehicle lane probability (referred to as "preceding-vehicle identification/own-vehicle lane probability compensation process" hereinafter) is explained with reference to FIGS. 2 to 7. The preceding-vehicle identification/own-vehicle lane probability compensation process is a part of the process for controlling the following distance, which is performed when a preceding vehicle is identified or continues to be identified as an object of the following-distance control.

First, the preceding-vehicle identification/own-vehicle lane probability compensation process performed by the controlled object identifying section 10 of the following-distance controller 1 is explained. When the vehicle driver of the own vehicle starts the ACC system to cause the own vehicle to automatically follow a preceding vehicle at a predetermined speed and at a predetermined distance to the preceding vehicle, the controlled object identifying section 10 of the following-distance controller 1 starts calculation of an existence probability of a curved road or the like ahead of the own vehicle in step S10.

Here, "a curved road or the like" means a road having a lane in which the own vehicle is running, including a curved road having a certain curvature and a straight road whose curvature is infinite. Preferably, such a curved road is defined by an easement curve. More preferably, such a curved road is defined by a clothoid curve.

In this embodiment, to obtain an existence probability of a curved road or the like, first to third probability calculation processes are performed based on first to third detection signals, respectively. The first probability calculation process is for obtaining an existence probability of a curved road or the like based on the first detection signal regarding presence or absence of a curved road or the like, which is outputted from the radar sensor 31 (see FIG. 3). The second probability calculation process is for obtaining an existence probability of a curved road or the like based on the second detection signal regarding the track of a preceding vehicle which is outputted from the radar sensor 31 (see FIG. 4). The third probability calculation process is for obtaining an existence probability of a curved road or the like based on the third detection signal which is outputted from the yaw rate sensor 32 (see FIG. 5).

Next, each of the first to third probability calculation processes is explained.

Figure 3:
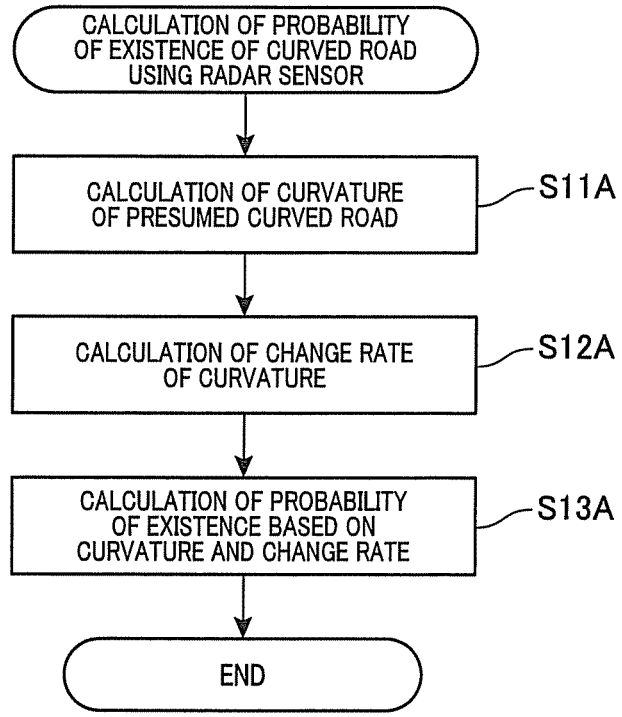
FIG. 3 is a flowchart showing steps of a probability calculation process for obtaining an existence probability $P_{Sns}$ of a curved road or the like based on a detection signal outputted from a radar sensor.

First, the first calculation process for obtaining an existence probability $P_{Sns}$ of a curved road or the like based on the first detection signal is explained with reference to the flowchart of FIG. 3. The curve probability calculating section 11 of the controlled object identifying section 10 extracts a signal regarding a curved road or the like present ahead of the own vehicle (for example, a signal regarding a radio wave reflected from a road sign or a guard rail), presumes presence of a curved road or the like based on this extracted detection signal, and calculates the curvature of the presumed curved road (step S11A).

Thereafter, the curve probability calculating section 11 calculates a rate of change of the curvature based on the values of the calculated curvature. Next, the curve probability calculating section 11 calculates the existence probability $P_{Sns}$ based on the calculated curvature and the calculated rate of change of the curvature. The calculated existence probability $P_{Sns}$ is stored in the storage section 14. With that, the first calculating process is completed.

Figure 4:
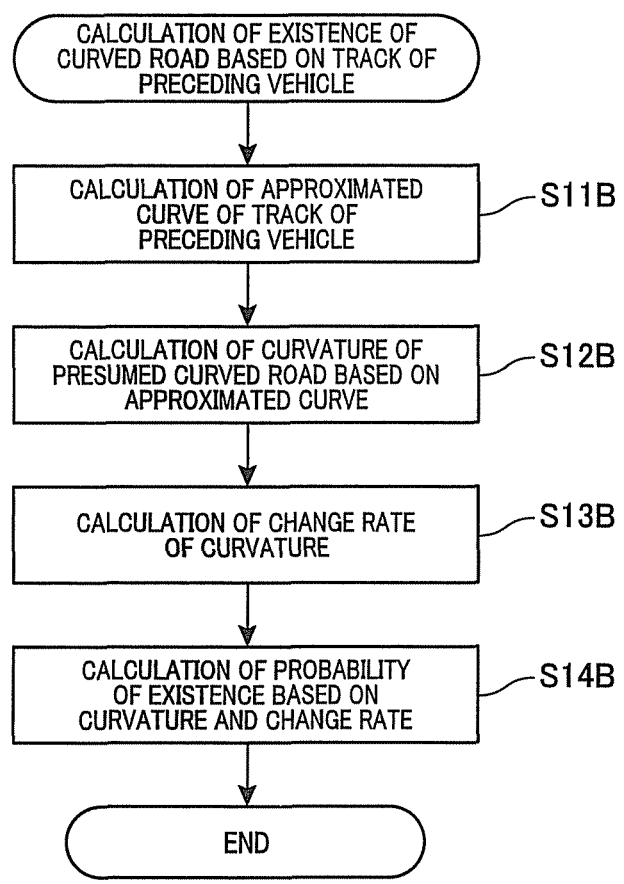
FIG. 4 is a flowchart showing steps of a probability calculation process for obtaining an existence probability $P_{Traj}$ of a curved road or the like based on the track of a preceding vehicle.

Next, the second probability calculation process for obtaining an existence probability $P_{Traj}$ of a curved road or the like based on the track of a preceding vehicle is explained with reference to the flowchart of FIG. 4. The curve probability calculating section 11 calculates an approximated curve of the track of a preceding vehicle based on the detection signal regarding the position of the preceding vehicle outputted from the radar sensor 31 in step S11B. More specifically, the curve probability calculating section 11 calculates a track (positions at different times) of a preceding vehicle within a predetermined period of time based on the values of the detection signal regarding the positions at different past times of the preceding vehicle which have been stored in the storage section 14, and then calculates an approximated curve of the calculated track. Various methods can be used to calculate the approximated curve if a distance between the calculated approximated curve and the track of the preceding vehicle is sufficiently small.

Thereafter, the curve probability calculating section 11 calculates the curvature of the presumed curved road based on the calculated approximated curve (step S12B). The calculated approximated curve represents the shape of the presumed curved road or the like. Next, the curve probability calculating section 11 calculates a rate of change of the curvature of the presumed curved road or the like (step S13B).

Further, the curve probability calculating section 11 calculates the existence probability $P_{Traj}$ based on the calculated curvature and the calculated rate of change of the curvature (step S14B). The calculated existence probability $P_{Traj}$ is stored in the storage section 14. With that, the second calculating process is completed.

Figure 5:
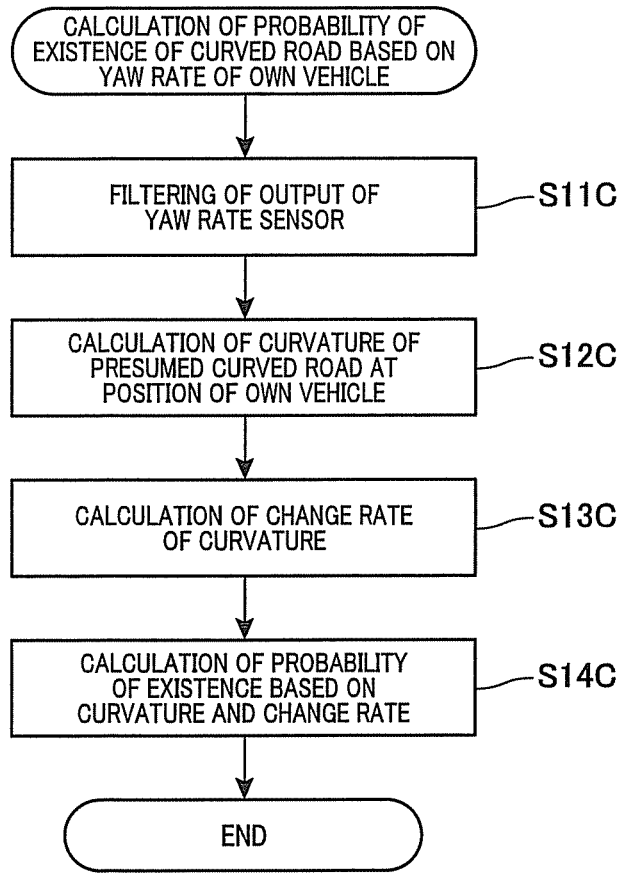
FIG. 5 is a flowchart showing steps of a probability calculation process for obtaining an existence probability $P_{Yaw}$ of a curved road or the like based on a detection signal outputted from a yaw rate sensor.

Finally, the third calculating process for obtaining an existence probability $P_{Yaw}$ of a curved road or the like based on the yaw rate of the own vehicle is explained with reference to the flowchart of FIG. 5. The curve probability calculating section 11 performs a filtering operation to remove noise from the detection signal outputted from the yaw rate sensor 32 (step S11C). After completion of the filtering, the curve probability calculating section 11 calculates the curvature of the presumed curved road or the like at the position of the own vehicle (step S12C). More specifically, the curve probability calculating section 11 presumes presence of a curved road or the like ahead of the own vehicle, and calculates the curvature of the presumed curved road or the like based on the detection signal outputted from the yaw rate sensor 32.

Next, the curve probability calculating section 11 calculates a rate of change of the curvature of the presumed curved road based on the values of the calculated curvature (S13C). Thereafter, the curve probability calculating section 11 calculates the existence probability $P_{Yaw}$ based on the calculated curvature and the calculated rate of change of the curvature (step S14C). The calculated existence probability $P_{Yaw}$ is stored in the storage section 14.

With that, the third calculating process is completed.

After completion of the process shown in FIG. 3, the controlled object identifying section 10 checks in step S20 shown in FIG. 2 whether each of predetermined compensation conditions is satisfied or not to determine whether a later-explained compensation process of the own-vehicle lane probability should be performed in the following step S30 or the preceding-vehicle identification/own-vehicle lane probability compensation process should be terminated.

The compensation conditions include the following conditions (Y1) to (Y4). If all of the conditions (Y1) to (Y4) are satisfied, it is determined that the compensation process should be started.

(Y1) The running speed of the own vehicle is higher than or equal to a predetermined threshold speed.

(Y2) A preceding vehicle is present.

(Y3) The own vehicle is following a preceding vehicle for or for more than a predetermined threshold time.

(Y4) The following distance to a preceding vehicle is set to a distance greater than or equal to a predetermined threshold distance.

The compensation conditions further include the following conditions (N1) to (N4). If at least one of the conditions (N1) to (N4) is satisfied, it is determined that the preceding vehicle identification/own-vehicle lane probability compensation process should be terminated.

(N1) The running speed of the own vehicle is lower than the predetermined threshold speed.

(N2) No preceding vehicle is present.

(N3) The own vehicle is following a preceding vehicle for less than the predetermined threshold time.

(N4) The following distance to a preceding vehicle is set to a distance less than the predetermined threshold distance.

Accordingly, if all of the conditions (Y1) to (Y4) are satisfied, the preceding-vehicle identification/own-vehicle lane probability compensation process performs step S30, and then is terminated. On the other hand, if at least one of the conditions (N1) to (N4) is satisfied, the preceding-vehicle identification/own-vehicle lane probability compensation process is terminated without performing step S30.

Figure 6:
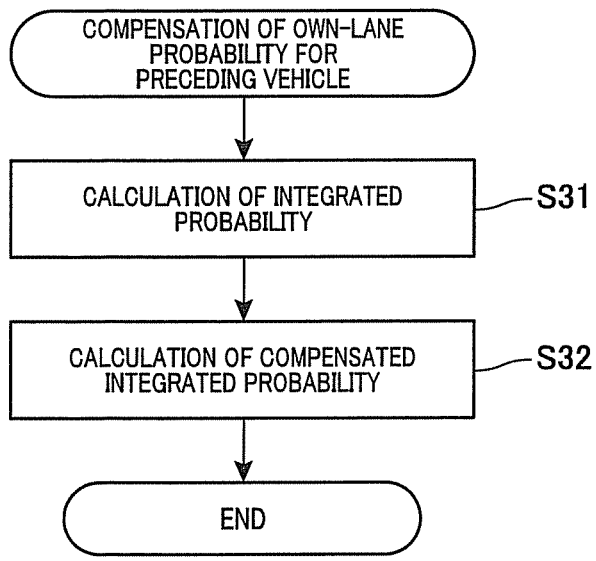
FIG. 6 is a flowchart showing steps of a process for compensating an own-vehicle lane probability.

Next, the process for compensating the own-vehicle lane probability (referred to as "own-vehicle lane probability compensation process" hereinafter) is explained with reference to the flowchart of FIG. 6.

This step begins in step S31 where the curve probability calculating section 11 calculates an integrated existence probability $P_{Crv}$ in accordance with the following expression (1) and the values of the existence probabilities PSns, $P_{Traj}$ and $P_{Yaw}$ stored in the storage section 14.

$$P_{Crv} = \frac{P_{Sns} \cdot P_{Traj} \cdot P_{Yaw}}{\{P_{Sns} \cdot P_{Traj} \cdot P_{Yaw} + (1 - P_{Sns}) \cdot (1 - P_{Traj}) \cdot (1 - P_{Yaw})\}} \quad (1)$$

Figure 7:
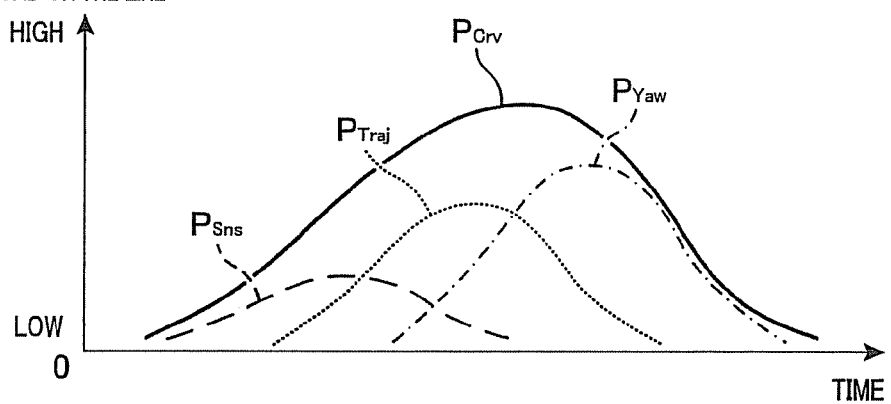
FIG. 7 is a graph showing a relationship among the existence probabilities $P_{Sns}$, $P_{Traj}$ and $P_{Yaw}$, and an integrated existence probability $P_{Crv}$.

FIG. 7 is a graph showing a relationship among the existence probabilities $P_{Sns}$, $P_{Traj}$ and $P_{Yaw}$, and the integrated existence probability $P_{Crv}$. As shown in FIG. 7, the existence probability $P_{Sns}$ peaks at the earliest timing, the existence probability $P_{Traj}$ peaks at the second earliest timing, and the existence probability $P_{Yaw}$ peaks at the latest timing. In other words, the existence probability $P_{Sns}$ peaks when the own vehicle is far from a curved road, and the existence probability $P_{Traj}$ peaks next, and the existence probability $P_{Yaw}$ peaks finally.

In terms of peak value, the existence probability $P_{Sns}$ is the lowest, the existence probability $P_{Yaw}$ is the highest, and the existence probability $P_{Traj}$ is in between them. In this embodiment, the existence probabilities $P_{Sns}$, $P_{Traj}$ and $P_{Yaw}$ are weighted equally as shown in the expression (1). However, they may be weighted satisfying the condition of the weighting factor of the existence probability $P_{Sns}$<the weighting factor of the existence probability $P_{Traj}$<the weighting factor of the existence probability $P_{Yaw}$, so that the integrated existence probability $P_{Crv}$ becomes more reliable. This is based on the fact that the existence probability $P_{Traj}$ is more reliable than the existence probability $P_{Sns}$, and the existence probability $P_{Yaw}$ is more reliable than the existence probability $P_{Traj}$.

After the integrated existence probability $P_{Crv}$ is calculated, the controlled object candidate calculating section 12 compensates the own-vehicle lane probability in step S32. More specifically, the controlled object candidate calculating section 12 calculates a compensated own-vehicle lane probability $P_{Prob\#cmp}$ in accordance with the following expression (2), and the values of the integrated existence probability $P_{Crv}$ and the own-vehicle lane probability $P_{prob}$ before being compensated.

$$P_{Prob\#cmp}=100 \cdot P_{Crv}+P_{Prob} \cdot (1-P_{Crv}) \qquad (2)$$

Figure 2:
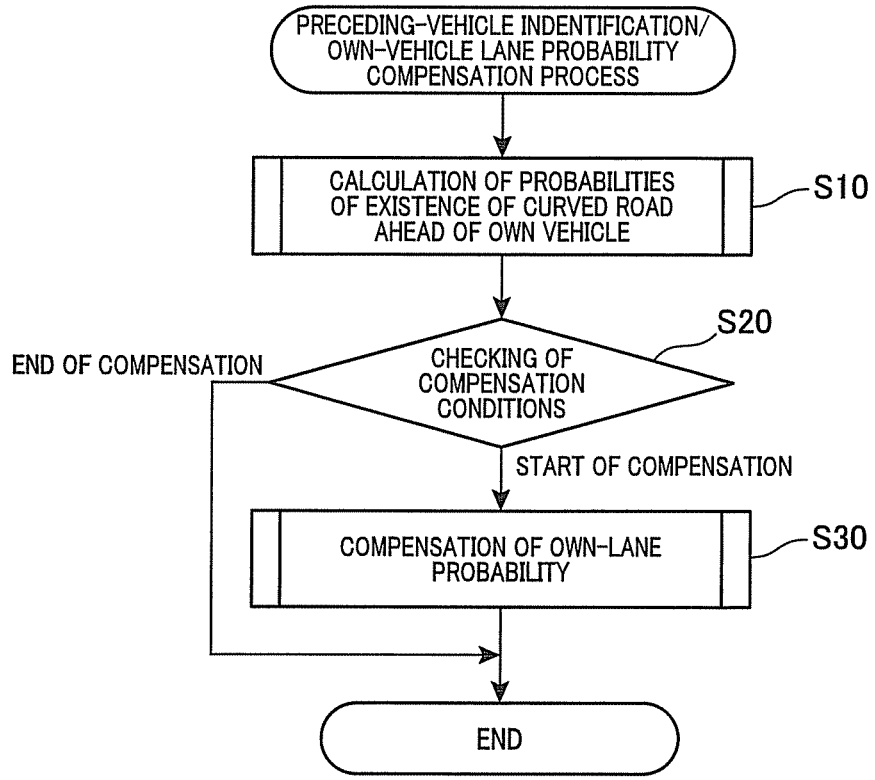
FIG. 2 is a flowchart showing steps of a preceding vehicle identification/own-vehicle lane probability compensation process performed by a controlled object identifying section included in the following-distance controller.

When the compensated own-vehicle lane probability $P_{Prob\#cmp}$ is calculated, the preceding-vehicle identification/own-vehicle lane probability compensation process shown in FIG. 2 is terminated. Here, the own-vehicle lane probability $P_{prob}$ before compensation is obtained based on an offset amount between a predicted running line of the own vehicle and the track of a preceding vehicle, and a probability map pre-stored in the storage section 14. The predicted running line of the own vehicle is a running line along which the own vehicle is predicted to run. The offset amount is a minimal distance between the predicted running line and the approximated curve of the track of a preceding vehicle at a predetermined position between the own vehicle and the preceding vehicle. That is, the offset amount is a lateral distance between the own vehicle and the preceding vehicle.

The controlled object setting section 13 determines whether or not the own vehicle is running following a preceding vehicle based on the compensated own-vehicle lane probability $P_{Prob\#cmp}$. If the determination result is affirmative, the controlled object setting section 13 sets the preceding vehicle as a controlled object for which the following distance control should be performed.

After that, the control target value calculating section 21 performs a process for controlling the running speed of the own vehicle in order to keep the following distance between the own vehicle and the preceding vehicle at a set distance. For example, if the actual following distance is smaller than the set distance, the control target value calculating section 21 performs the process to decrease the speed of the own vehicle to thereby extend the actual following distance. More specifically, the control target value calculating section 21 outputs a control signal to the engine ECU 41 to reduce the output power of the engine, or outputs a control signal to the brake ECU 42 to apply brake to the own vehicle.

On the other hand, if the speed of the own vehicle is so small as to cause the following distance to the preceding vehicle to increase from the set distance, the control target value calculating section 21 performs the process to increase the speed of the own vehicle. More specifically, the control target value calculating section 21 outputs a control signal to the engine ECU 41 to increase the output power of the engine.

Concurrently with such control, the control target value calculating section 21 outputs a control signal to the meter ECU 43 which controls a meter indicator section of the own vehicle, to inform the vehicle driver of the current control state.

According to the controlled object identifying section 10 of the following-distance controller 1, since the own-vehicle lane probability $P_{prob}$ is compensated based on the integrated existence probability $P_{Crv}$ obtained by integrating the existence probability $P_{Sns}$ which is a probability of existence of a curved road ahead of the own vehicle obtained based on the road condition ahead, the existence probability $P_{Traj}$ obtained based on the track of a preceding vehicle, and the existence probability $P_{Yaw}$ obtained based on the own vehicle's entering a curved road, it is possible to perform identification of a preceding vehicle at an earlier timing and to improve reliability of the identification.

This is because, since the integrated existence probability $P_{Crv}$ includes the existence probability $P_{Sns}$ obtained based on the detection signal outputted from the radar sensor 31 which can detect a curved road far away from the own vehicle, the own-vehicle lane probability $P_{Prob}$ for a preceding vehicle can be obtained at an earlier timing, and the preceding vehicle identification can be performed reliably using the reliable own-vehicle lane probability $P_{Prob\#cmp}$ obtained by compensating the own-vehicle lane probability $P_{Prob}$.

Further, since the integrated existence probability $P_{Crv}$ includes the existence probability $P_{Traj}$ which is obtained based on the track of a preceding vehicle and enables detecting a curved road more reliably than the existence probability $P_{Sns}$ when a detecting distance is short, the reliability of the integrated existence probability $P_{Crv}$ is high when the own vehicle is approaching a curved road compared to a case where the integrated existence probability $P_{Crv}$ includes only the existence probability $P_{Sns}$. Further, since the integrated existence probability $P_{Crv}$ includes the existence probability $P_{Yaw}$ obtained based on the detection signal outputted from the yaw rate sensor 32, which is most reliable in detecting curved road when a detecting distance is short, the reliability of the integrated existence probability $P_{Crv}$ is high when the own vehicle is entering the curved road compared to a case where the integrated existence probability $P_{Crv}$ does not include the existence probability $P_{Yaw}$. Hence, according to this embodiment, the reliability of the own-vehicle lane probability can be improved.

By performing the process for compensating the own-vehicle lane probability $P_{Prob}$ only when the own vehicle is running following a preceding vehicle, that is, only when it is necessary to identify a preceding vehicle, it is possible to prevent the controlled object setting section 13 from performing an unnecessary calculation process.

According to the above embodiment which uses the radar sensor 31, an amount of calculation process necessary to detect the road condition ahead of the own vehicle can be made smaller than conventional apparatuses where the road condition ahead of the own vehicle is detected by analyzing images taken by a vehicle-mounted camera. Further according to the above embodiment which uses the radar sensor 31, the road condition ahead of the own vehicle can be detected more reliably than the conventional apparatuses, because the analysis of the taken images is affected by environmental conditions such as the sun light.

By using the yaw rate sensor 32, it is possible to reliably detect that the own vehicle has entered a curved road based on the yaw rate of the own vehicle. According to the above embodiment, the structure for detecting the yaw rate can be made compact in size compared to conventional apparatuses where the yaw rate of the own vehicle is detected based on not the yaw rate but the speed and angle of the steering wheel of the own vehicle.

According to the following-distance controller 1, it is possible to make the change of the speed of the own vehicle necessary to keep the following distance to a preceding vehicle more gentle than a case where the controlled object identifying section 10 is not provided. This is because, since the provision of the controlled object identifying section 10 enables the apparatus to suppress delay of the timing of identification of a preceding vehicle and improve reliability of the identification, it becomes easy to detect the following distance to a preceding vehicle and to ensure a period of time necessary for performing the control of the speed of the own vehicle.

In the above embodiment, compensation of the own-vehicle lane probability $P_{Prob}$ for a preceding vehicle is performed based on the detection signals outputted from the radar sensor 31 and the yaw rate sensor 32. However, information regarding whether a preceding vehicle has left from the own vehicle lane may be acquired as auxiliary information by analyzing an image ahead of the own vehicle taken by a vehicle-mounted camera in order to further improve the reliability of the own-vehicle lane probability $P_{Prob}$.

The above embodiment uses the integrated existence probability $P_{Crv}$ obtained by integrating the three existence probabilities $P_{Sns}$, $P_{Traj}$ and $P_{Yaw}$. However, the integrated existence probability $P_{Crv}$ may be obtained by integrating two of the three existence probabilities $P_{Sns}$, $P_{Traj}$ and $P_{Yaw}$.

The above explained preferred embodiments are exemplary of the invention of the present application which is described solely by the claims appended below. It should be understood that modifications of the preferred embodiments may be made as would occur to one of skill in the art.

What is claimed is:

1. A preceding-vehicle identifying apparatus for identifying, as a preceding vehicle, a vehicle running ahead of an own vehicle based on an own-vehicle lane probability which is a probability that the vehicle is running in the same lane as an own-vehicle lane in which the own vehicle is running, the apparatus comprising:
    a controller;
    a detection signal acquiring section of the controller that receives at least two of a first detection signal indicative of a curvature of a curved road ahead of the own vehicle, a second detection signal indicative of a track of a vehicle running ahead of the own vehicle and a third detection signal indicative of the own vehicle having entered the curved road, the first to third detection signals being outputted from first to third detecting sections, respectively, which are mounted on the own vehicle;
    a first calculating section of the controller that calculates at least two of a first probability of existence of the curved road ahead of the own vehicle based on the first detection signal, a second probability of existence of the curved road ahead of the own vehicle based on the second detection signal and a third probability of existence of the curved road ahead of the own vehicle based on the third detection signal, and calculates an integrated probability of existence of the curved road ahead of the own vehicle based on integration of the at least two of the first to third probabilities; and
    a second calculating section of the controller that calculates the own-vehicle lane probability based on a distance between a predicted running line of the own vehicle along which the own vehicle is predicted to run and the track of the vehicle running ahead of the own vehicle, and performs an own-vehicle lane probability compensation process for compensating the calculated own-vehicle lane probability based on the integrated probability.

2. The preceding-vehicle identifying apparatus according to claim 1, wherein the second calculating section is configured to perform the own-vehicle lane probability compensation process when it is determined that the own vehicle is following the vehicle running ahead of the own vehicle.

3. The preceding vehicle identifying apparatus according to claim 1, wherein the first calculating section calculates the integrated probability based on the at least two of the first to third probabilities which are weighted by first to third weights, respectively, the third weight being larger than the second weight, the second weight being larger than the first weight.

4. The preceding-vehicle identifying apparatus according to claim 1, wherein the first and second detecting sections commonly include a scanning sensor for detecting a road condition ahead of the own vehicle and a track of a vehicle running ahead of the own vehicle.

5. The preceding-vehicle identifying apparatus according to claim 1, wherein the third detecting section includes a yaw rate sensor for detecting a yaw rate of the own vehicle.

6. A following-distance control apparatus mounted on a vehicle for controlling a following distance between the own vehicle and a preceding vehicle running in the same lane as the own vehicle within a predetermined range when the own vehicle follows the preceding vehicle, comprising:
    the preceding-vehicle identifying apparatus recited in claim 1; and
a controller for controlling a following distance between the own vehicle and a vehicle identified as the preceding vehicle by the preceding-vehicle identifying apparatus by controlling a running speed of the own vehicle in accordance with the following distance.

7. The preceding-vehicle identifying apparatus according to claim 1, wherein one of the at least two of the first to third detection signals is the second detection signal.

8. The preceding-vehicle identifying apparatus according to claim 7, wherein one of the at least two of the first to third probabilities is the second probability.

9. The preceding-vehicle identifying apparatus according to claim 1, wherein one of the at least two of the first to third probabilities is the second probability.

10. The preceding-vehicle identifying apparatus according to claim 1, wherein the track of the vehicle running ahead of the own vehicle is calculated using positions of the vehicle running ahead of the own vehicle at different times within a predetermined period of time.

11. The preceding-vehicle identifying apparatus according to claim 10, wherein the positions of the vehicle running ahead of the own vehicle at different times are stored in a storage section of the controller.

12. The preceding-vehicle identifying apparatus according to claim 11, wherein one of the at least two of the first to third detection signals is the second detection signal.

13. The preceding-vehicle identifying apparatus according to claim 12, wherein one of the at least two of the first to third probabilities is the second probability.

14. The preceding-vehicle identifying apparatus according to claim 11, wherein one of the at least two of the first to third probabilities is the second probability.

15. The preceding-vehicle identifying apparatus according to claim 10, wherein one of the at least two of the first to third detection signals is the second detection signal.

16. The preceding-vehicle identifying apparatus according to claim 15, wherein one of the at least two of the first to third probabilities is the second probability.

17. The preceding-vehicle identifying apparatus according to claim 10, wherein one of the at least two of the first to third probabilities is the second probability.

* * * * *